(12) United States Patent
Skinner et al.

(10) Patent No.: US 12,434,558 B1
(45) Date of Patent: Oct. 7, 2025

(54) DRIVE AXLE ASSEMBLY, INTERAXLE DIFFERENTIAL ASSEMBLY, AND INTEGRATED INTERAXLE BEVEL GEAR AND INPUT SIDE GEAR

(71) Applicant: VOLVO TRUCK CORPORATION, Gothenburg (SE)

(72) Inventors: Sean Skinner, Martinsburg, WV (US); Nicholas Lieberum, York Springs, PA (US); Zachary Lambertus, Chambersburg, PA (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/741,340

(22) Filed: Jun. 12, 2024

(51) Int. Cl.
| | |
|---|---|
| *B60K 17/36* | (2006.01) |
| *B60K 23/08* | (2006.01) |
| *F16H 48/08* | (2006.01) |
| *F16H 48/24* | (2006.01) |

(52) U.S. Cl.
CPC ............ *B60K 17/36* (2013.01); *F16H 48/08* (2013.01); *F16H 48/24* (2013.01); *B60K 23/08* (2013.01)

(58) Field of Classification Search
CPC .............. B60K 17/36; B60K 23/08; B60K 2023/085–0891; F16H 48/08–2048/087
See application file for complete search history.

(56) References Cited

U.S. PATENT DOCUMENTS

| | | | | |
|---|---|---|---|---|
| 1,635,657 | A * | 7/1927 | Blumer | B60K 17/36 |
| | | | | 180/24.04 |
| 1,736,836 | A * | 11/1929 | Rayburn | B60K 17/36 |
| | | | | 475/221 |
| 1,933,667 | A | 11/1933 | Fageol | |
| 3,887,037 | A * | 6/1975 | Haluda | F16N 7/14 |
| | | | | 184/6.12 |
| 6,200,240 | B1 | 3/2001 | Oates | |
| 8,795,125 | B2 * | 8/2014 | Ziech | F16H 48/22 |
| | | | | 475/221 |
| 10,001,201 | B2 * | 6/2018 | Martin | F16H 48/08 |
| 2018/0259052 | A1 | 9/2018 | Chinitz | |
| 2020/0047615 | A1 | 2/2020 | Eschenburg et al. | |
| 2023/0003290 | A1 | 1/2023 | Ullagaddi et al. | |

FOREIGN PATENT DOCUMENTS

| | | | | |
|---|---|---|---|---|
| EP | 1352771 A2 | 10/2003 | | |
| WO | WO-2015135705 A1 * | 9/2015 | ........... | B60K 17/346 |

OTHER PUBLICATIONS

European Search Report (Jul. 9, 2025) for corresponding European App. EP 25 16 6631.

* cited by examiner

*Primary Examiner* — James J Taylor, II
(74) *Attorney, Agent, or Firm* — Withrow & Terranova, PLLC

(57) ABSTRACT

A drive axle assembly includes an input shaft, an output shaft, and an interaxle differential comprising at least one spider gear rotatable about an axis perpendicular to the input shaft, an output side gear in meshing engagement with the at least one spider gear and non-rotatably mounted on the output shaft, and an integrated interaxle differential bevel gear and input side gear rotatably supported on the input shaft, the input side gear being in meshing engagement with the at least one spider gear.

12 Claims, 7 Drawing Sheets

DRIVE AXLE ASSEMBLY, INTERAXLE DIFFERENTIAL ASSEMBLY, AND INTEGRATED INTERAXLE BEVEL GEAR AND INPUT SIDE GEAR

TECHNICAL FIELD

The disclosure relates generally to drive axle assemblies. In particular aspects, the disclosure relates to drive axle assemblies, interaxle differential assemblies, and bevel gears and interaxle differential input side gears for interaxle differential assemblies. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In tandem drive vehicles, such as tandem drive trucks of the general type shown in FIG. 1, an interaxle differential is ordinarily provided to distribute power to front and rear drive axles of the vehicle and, more particularly, to front and rear interwheel differentials of the vehicles. Conventional configurations for interaxle differentials and front interwheel differentials locate the input side gear at a significant distance from the drive pinion that transmits power to the front interwheel differential. A common conventional configuration for a drive axle assembly 125 is shown schematically in FIG. 2 wherein an input side gear 149 and a drive gear 175 are connected to each other and rotatably mounted around an input shaft 137 on which an interaxle differential is 131 is non-rotatably mounted. The drive gear 175 drives a driven gear 177 which is connected by a shaft 179 to, finally, a bevel gear 147 that drives a ring gear 181 on which an interwheel differential 133 is mounted. The inventors have recognized that such designs tend to involve a substantial portion of the length of the vehicle's drivetrain, and constitute a significant portion of the weight of the drivetrain. Additionally, such designs tend to require a substantial number of bearing arrangements for supporting the input side gear and the drive pinion relative to the input shaft and other components of the interaxle differential.

It is desirable to provide an interaxle differential assembly and other components of a drivetrain having a compact geometry along the length of the drivetrain. It is also desirable to provide an interaxle differential assembly and other components of a drivetrain that minimizes the weight of the drivetrain. It is further desirable to provide drive axle assembly that permits use of a minimal amount of bearings.

SUMMARY

According to a first aspect of the disclosure, a drive axle assembly is provided, comprising an input shaft, an output shaft, and an interaxle differential comprising at least one spider gear rotatable about an axis perpendicular to the input shaft, an output side gear in meshing engagement with the at least one spider gear and non-rotatably mounted on the output shaft, and an integrated interaxle differential bevel gear and input side gear rotatably supported on the input shaft, the input side gear being in meshing engagement with the at least one spider gear.

A technical benefit may include facilitating drive axle assembly and interaxle differential geometry options that can reduce the length and weight of the interaxle differential and the drive axle assembly.

Optionally in some examples, including in at least one preferred example, the drive axle assembly as set forth above further comprises an interwheel differential assembly arranged to receive torque from an interaxle differential bevel gear of the integrated interaxle differential bevel gear and input side gear.

A technical benefit may include facilitating drive axle assembly geometry options that can reduce the length and weight of the interaxle differential and the interwheel differential assembly that receives torque from the interaxle differential bevel gear.

Optionally in some examples, including in at least one preferred example, in the drive axle assembly as set forth above, the interwheel differential assembly includes a differential gear on which one or more spider gears are mounted for rotation about an axis perpendicular to an axis of the differential gear.

A technical benefit may include facilitating drive axle assembly geometry options that can reduce the length and weight of the interaxle differential and the interwheel differential assembly that receives torque from the interaxle differential bevel gear.

Optionally in some examples, including in at least one preferred example, the drive axle assembly as set forth above further comprises a driven bevel gear in meshing engagement with the interaxle differential bevel gear.

A technical benefit may include facilitating drive axle assembly geometry options and minimizing a number of components of the drive axle assembly.

Optionally in some examples, including in at least one preferred example, an axis of rotation of the driven bevel gear and an axis of rotation of the at least one spider gear lie on a plane perpendicular to an axis of rotation of the interaxle differential.

A technical benefit may include facilitating drive axle assembly geometry options including, particularly, geometries that minimize an overall length of the drive axle assembly.

Optionally in some examples, including in at least one preferred example, the drive axle assembly as set forth above further comprises a hypoid gear in meshing engagement with the interaxle differential bevel gear.

A technical benefit may include facilitating drive axle assembly geometry options, and placement of drive axles in a plane below the interaxle differential utilizing a minimum number of components.

Optionally in some examples, including in at least one preferred example, in the drive axle assembly as set forth above, the integrated interaxle differential bevel gear and input side gear comprises an interaxle differential bevel gear and an input side gear, the interaxle differential bevel gear and the input side gear being non-rotatably connected so that a rear end of the input side gear faces a front end of the interaxle differential bevel gear.

A technical benefit may include facilitating configurations of the drive axle assembly of reduced length.

Optionally in some examples, including in at least one preferred example, in the drive axle assembly as set forth above, the interaxle differential bevel gear and the input side gear are formed as a unitary part.

A technical benefit may include facilitating manufacture of the interaxle differential bevel gear and the input side gear.

Optionally in some examples, including in at least one preferred example, in the drive axle assembly as set forth above, the interaxle differential bevel gear and the input side gear are separate parts that are non-rotatably attached to each other.

A technical benefit may include facilitating manufacture of the interaxle differential bevel gear and the input side gear and replacement of parts of the interaxle differential bevel gear and input side gear.

Optionally in some examples, including in at least one preferred example, in the drive axle assembly as set forth above, a shaft extends through an opening in at least one of the interaxle differential bevel gear and input side gear to non-rotatably attach the interaxle differential bevel gear and the input side gear to each other.

A technical benefit may include facilitating manufacture of the interaxle differential bevel gear and the input side gear and replacement of parts of the interaxle differential bevel gear and input side gear.

Optionally in some examples, including in at least one preferred example, the drive axle assembly as set forth above further comprises an interaxle differential lock arrangement.

A technical benefit may include facilitating transmitting power equally between both forward and rear drive axles.

Optionally in some examples, including in at least one preferred example, in the drive axle assembly as set forth above, the integrated interaxle differential bevel gear and input side gear comprises an interaxle differential bevel gear and an input side gear, and wherein the interaxle differential lock arrangement comprises a first locking member non-rotatably mounted on the input shaft and a second locking member on the interaxle differential bevel gear, the first locking member being movable toward the second locking member to engage with the second locking member and thereby lock the first locking member relative to the second locking member and movable away from the second locking member to disengage from the second locking member and unlock the first locking member relative to the second locking member.

A technical benefit may include facilitating transmitting power equally between both forward and rear drive axles with equipment of limited length.

Optionally in some examples, including in at least one preferred example, in the drive axle assembly as set forth above, the integrated interaxle differential bevel gear and input side gear comprises an interaxle differential bevel gear and an input side gear, wherein no bearings support the integrated interaxle differential bevel gear and input side gear relative to the input shaft.

A technical benefit may include reducing the number of bearings in and maintenance for a drive axle assembly.

According to a second aspect of the disclosure, a tandem drive truck comprises a drive train, the drive train comprising the drive axle assembly as set forth above.

A technical benefit may include reducing the length and weight of a drive axle assembly for a tandem drive truck.

According to a third aspect of the disclosure, an integrated interaxle differential bevel gear and input side gear for an interaxle differential, comprises a bevel gear, and a side gear non-rotatably connected to the bevel gear so that a rear end of the side gear faces a front end of the interaxle differential bevel gear.

A technical benefit may include facilitating configurations of the drive axle assembly of reduced length.

Optionally in some examples, including in at least one preferred example, in the integrated interaxle bevel gear and input side gear as set forth above, the bevel gear and the side gear are formed as a unitary part.

A technical benefit may include facilitating manufacture of the interaxle differential bevel gear and the input side gear.

Optionally in some examples, including in at least one preferred example, in the integrated interaxle bevel gear and input side gear as set forth above, the bevel gear and the side gear are separate parts that are non-rotatably attached to each other.

A technical benefit may include facilitating manufacture of the interaxle differential bevel gear and the input side gear and replacement of parts of the interaxle differential bevel gear and input side gear.

Optionally in some examples, including in at least one preferred example, in the integrated interaxle bevel gear and input side gear as set forth above, a shaft extends through an opening in at least one of the bevel gear and side gear to non-rotatably attach the bevel gear and the side gear to each other.

A technical benefit may include facilitating manufacture of the interaxle differential bevel gear and the input side gear and replacement of parts of the interaxle differential bevel gear and input side gear.

According to a fourth aspect of the disclosure, an interaxle differential, the interaxle differential being adapted to be non-rotatably supported on an input shaft, the interaxle differential comprising at least one spider gear rotatable about an axis perpendicular to an axis of the input shaft, an output side gear in meshing engagement with the at least one spider gear and non-rotatably mountable about an output shaft, and an integrated interaxle differential bevel gear and input side gear non-rotatably supportable on the input shaft, the input side gear being in meshing engagement with the at least one spider gear.

A technical benefit may include facilitating drive axle assembly and interaxle differential geometry options that can reduce the length and weight of the interaxle differential and the drive axle assembly.

Optionally in some examples, including in at least one preferred example, in the interaxle differential as set forth above, the at least one spider gear comprises a first and a second spider gear, the first and the second spider gear both being in meshing engagement with the output side gear and the input side gear.

A technical benefit may include facilitating effective transmission of power between both forward and rear drive axles with equipment of limited length.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
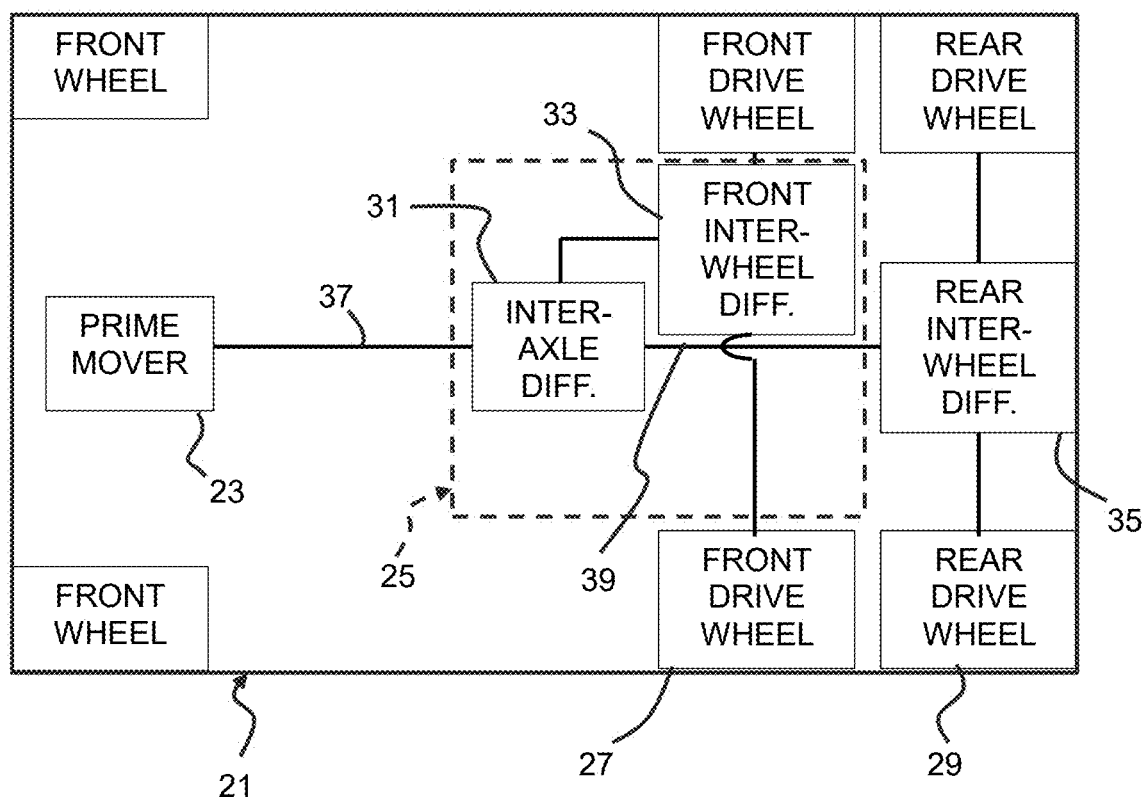
FIG. 1 is a schematic view of a tandem vehicle according to an example.
Figure 2:
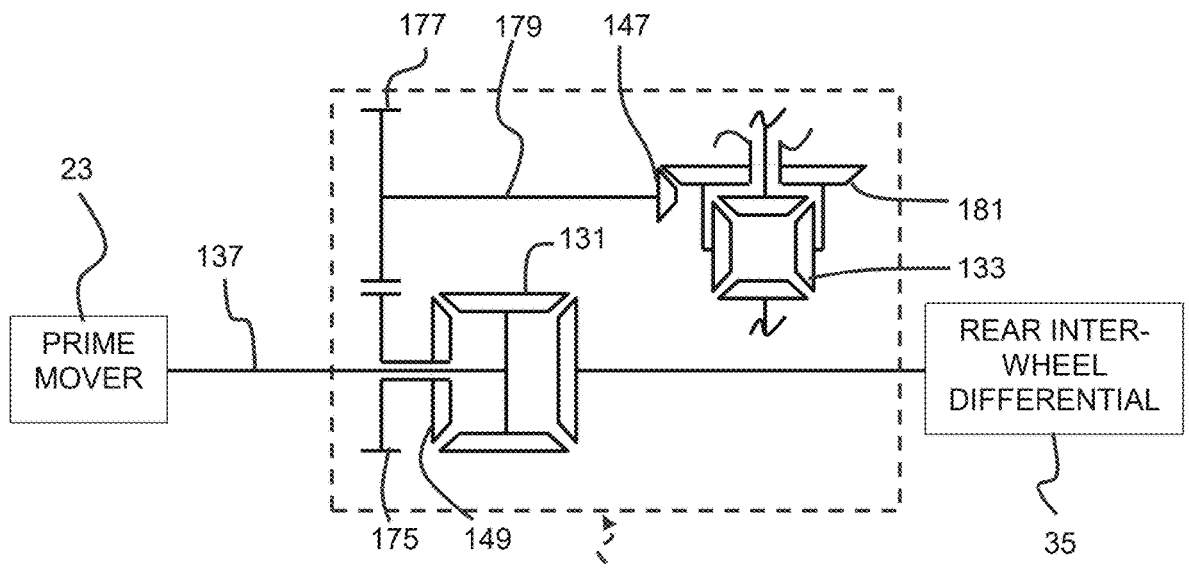
FIG. 2 is a schematic view of a prior art drive axle assembly.

FIG. 1 shows a conventional tandem tractor 21 with a prime mover 23 such as an internal combustion engine or electric motor connected to a drive axle assembly 25 according to an aspect of the present invention. A drivetrain of the tandem tractor 21 includes front drive wheels 27, rear drive wheels 29, an interaxle differential 31, a front drive axle interwheel differential 33, and a rear drive axle interwheel differential 35.

Figure 3:
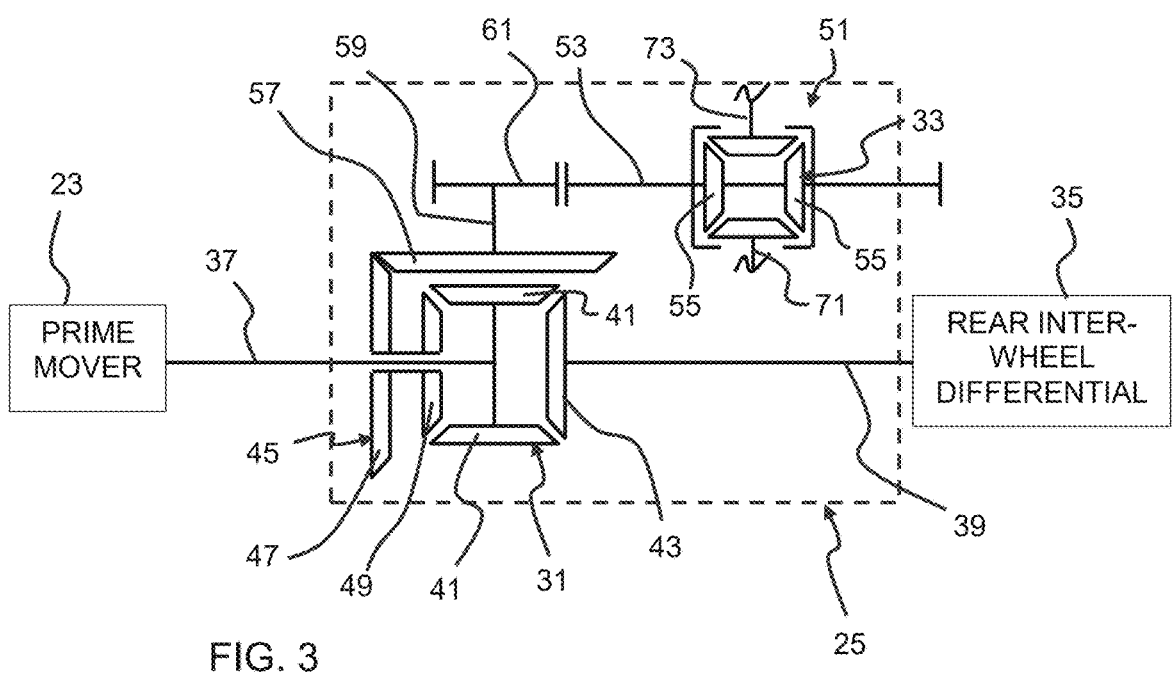
FIG. 3 is a schematic view of a drive axle assembly according to an aspect of the present invention.
Figure 4:
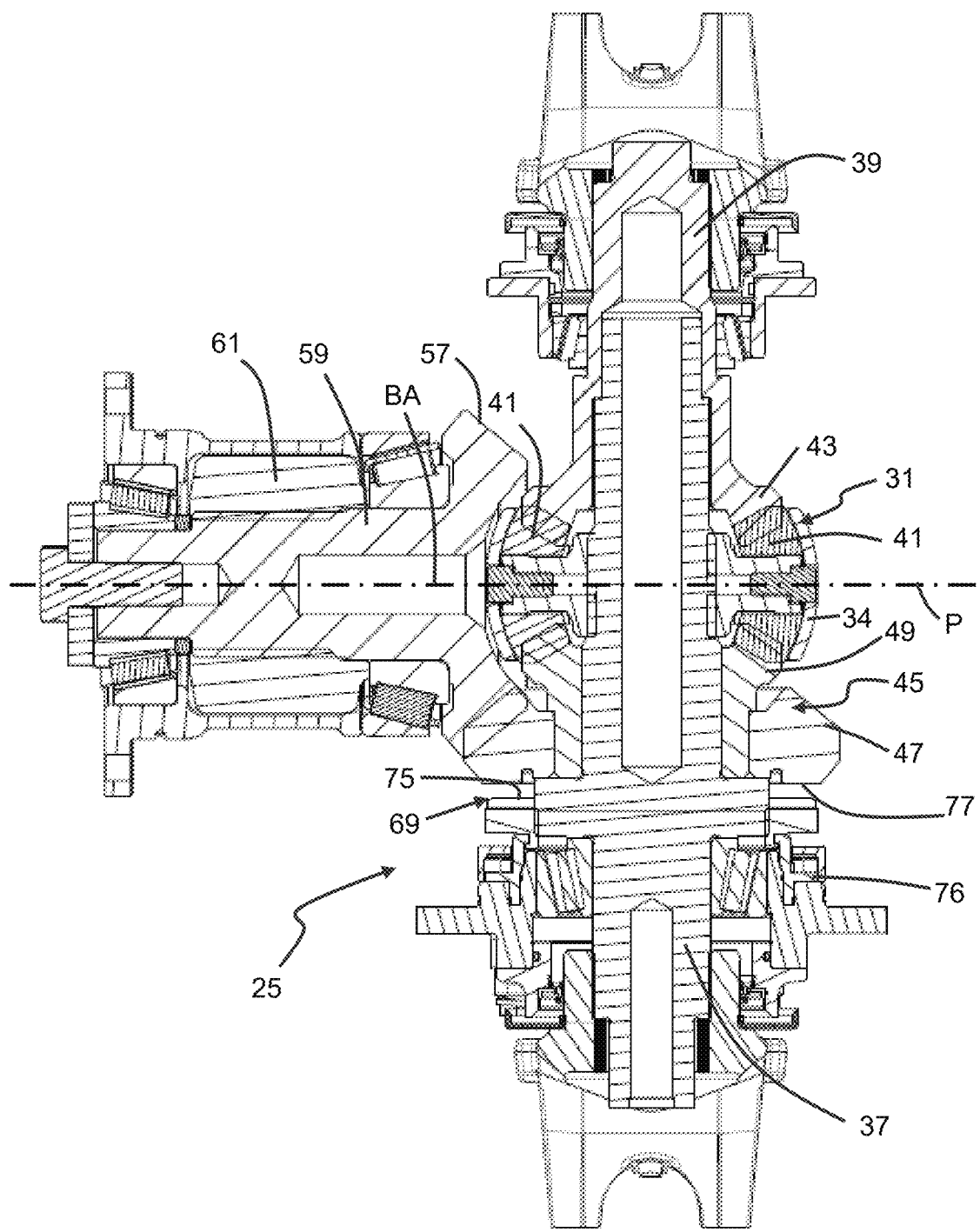
FIG. 4 is a top cross-sectional view of part of a drive axle assembly according to an aspect of the present invention.

The drive axle assembly 25 is shown in FIGS. 3 and 4 and comprises an input shaft 37 driven by the prime mover 23, an output shaft 39 connected to the rear drive wheel differential 35, and the interaxle differential 31. The interaxle differential 31 comprises at least one (usually plural) spider gear 41 rotatable about an axis perpendicular to the input shaft 37, an output side gear 43 in meshing engagement with the at least one spider gear and non-rotatably mounted on the output shaft 39 (the output side gear is typically provided as a single piece with the output shaft), and an integrated interaxle differential bevel gear and input side gear 45 rotatably supported on the input shaft, the input side gear being in meshing engagement with the at least one spider gear. The integrated interaxle differential bevel gear and input side gear 45 comprises an interaxle differential bevel gear 47 and an input side gear 49. The at least one spider gear 41 ordinarily comprises at least a first and a second spider gear 41a and 41b, the first and the second spider gear both being in meshing engagement with the output side gear 43 and the input side gear 49.

Figure 5:
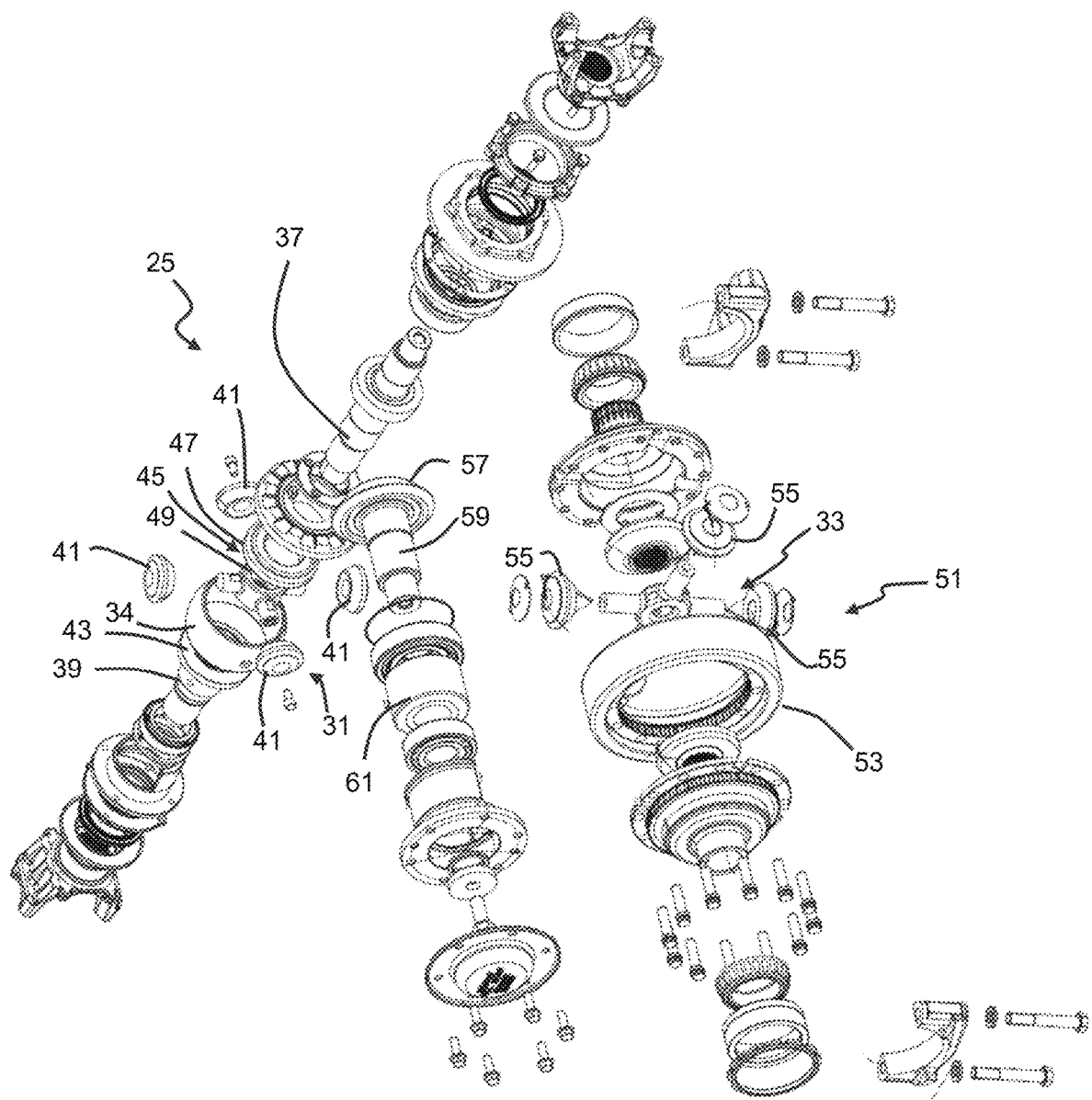
FIG. 5 is an exploded view of a drive axle assembly according to an aspect of the present invention.

As seen in FIGS. 3-5, the drive axle assembly 25 may further comprise a front drive axle interwheel differential assembly 51 including the front drive axle interwheel differential 33. The front drive axle interwheel differential assembly 51 is arranged to receive torque from the interaxle differential bevel gear 47. The interaxle differential bevel gear 47 is, however, substantially upstream of the interwheel differential assembly 51 and, more particularly, is directly attached to and driven with the input side gear 45. The front drive axle interwheel differential assembly 51 may include a differential gear 53 on which one or more interwheel differential spider gears 55 of the front drive axle interwheel differential 33 are mounted for rotation about an axis perpendicular to an axis of the differential gear.

Figure 6:
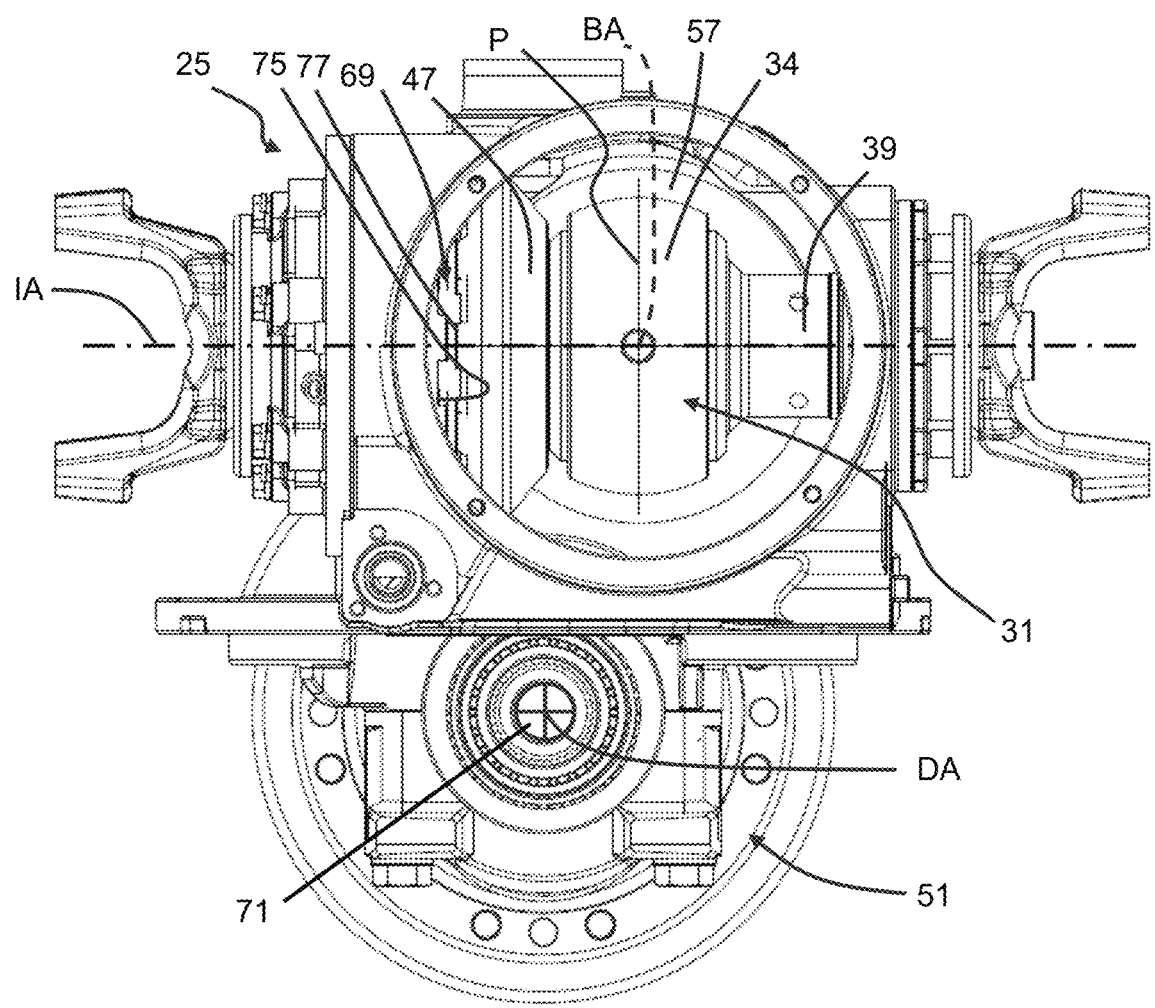
FIG. 6 is a side cross-sectional view of a drive axle assembly according to an aspect of the present invention.

FIGS. 3-5 show the drive axle assembly 25 including a driven bevel gear 57 in meshing engagement with the interaxle differential bevel gear 47. The configuration of FIGS. 3-5 facilitates containing the interaxle differential 31 and the front drive axle interwheel differential 33 within a limited longitudinal space along the length of the drivetrain. In the particular configuration of FIGS. 3 and 5, the driven bevel gear 57 is linked, such as by a shaft 59, to a gear 61 which drives the differential gear 53. For example, as seen in FIG. 4, an axis of rotation BA of the driven bevel gear 57 and an axis of rotation of the at least one spider gear 41 lie on a plane P perpendicular to an axis of rotation of the interaxle differential 31. The axis of rotation of the at least one spider gear 41 typically lies on plane P through the longitudinal center of a case 34 of the interaxle differential 31, and the at least one spider gear is mounted on an axle attached to the case. The axis of rotation BA of the driven bevel gear 57 may lie in the plane P and the center of the driven bevel gear may have a concave recess in which a convex outer surface of the case 34 of the interaxle differential 31 may be disposed and allowed to rotate, thus facilitating compact packaging of the drive axle assembly 25. The configuration shown in FIG. 6 can facilitate locating the left and right drive axles 71 and 73 (seen in FIG. 3) in a variety of different positions relative to the axis of rotation of the at least one spider gear 41. In FIG. 6, the left drive axle 71 (and the right drive axle 73, not shown) are shown as being connected to the front drive axle interwheel differential assembly 51 and define a drive axle axis DA that is perpendicular to an axis IA of the input shaft 37 (FIG. 3) and is disposed, in a longitudinal direction of the drivetrain, longitudinally forward of the axis of rotation of the at least one spider gear 41, i.e. the longitudinal center of the case of the interaxle differential 31. The drive axle axis DA may, however, be disposed, in a longitudinal direction of the drivetrain, longitudinally even with or behind of the axis of rotation of the at least one spider gear 41 as might be desired for other packaging configurations. The configuration shown in FIG. 6 can facilitate keeping the overall length of the interaxle differential 31 and the front drive axle differential assembly 51 in the longitudinal direction of the drive train to a minimum and keeping the weight of the interaxle differential and the front drive axle differential assembly to a minimum.

Figure 7:
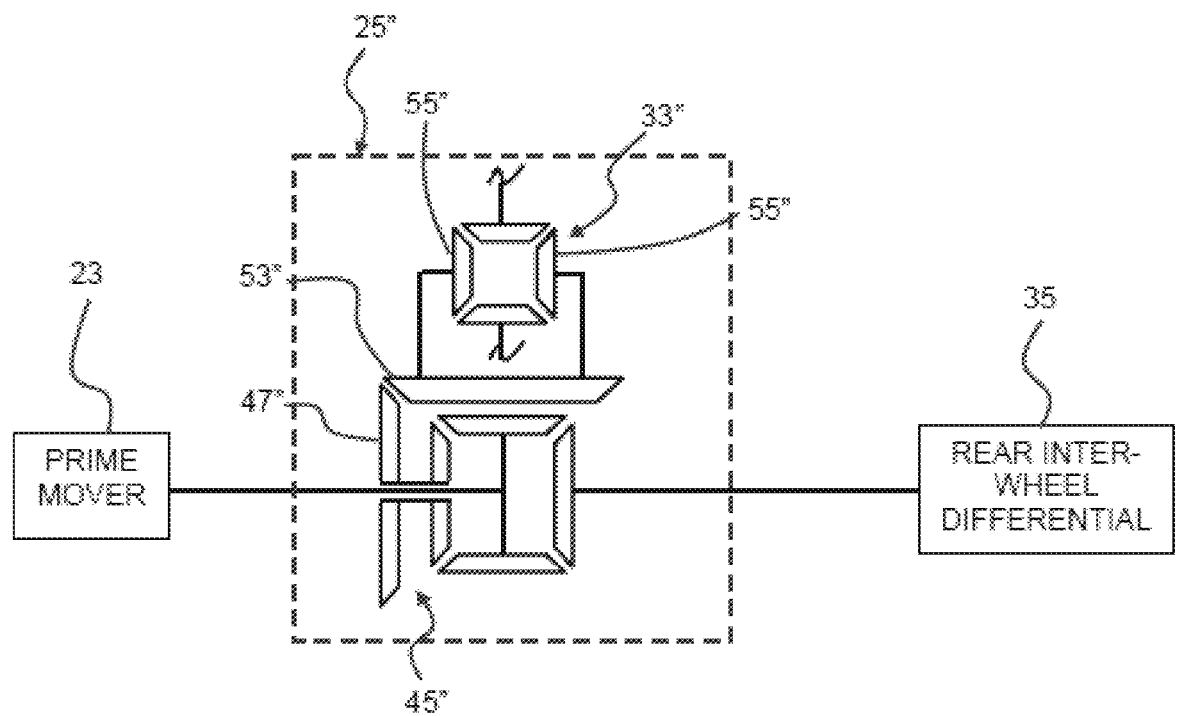
FIG. 7 is a schematic view of a drive axle assembly according to another aspect of the present invention.

FIG. 7 shows an alternative drive axle assembly configuration 25". In FIG. 7, the bevel gear 47" of the integrated interaxle differential bevel gear and input side gear 45" is a hypoid gear that meshes with a hypoid gear 53" on which one or more interwheel differential spider gears 55" of the front drive axle interwheel differential 33" are mounted. The use of a bevel gear 47" that is a hypoid gear that meshes with another hypoid gear 53" facilitates avoiding having the axis of rotation of the bevel gear lie in the same plane as the hypoid gear and may facilitate use of fewer gears. It will be appreciated that the configurations illustrated in FIGS. 3-7 are illustrative and not intended to be limiting.

Figure 8:
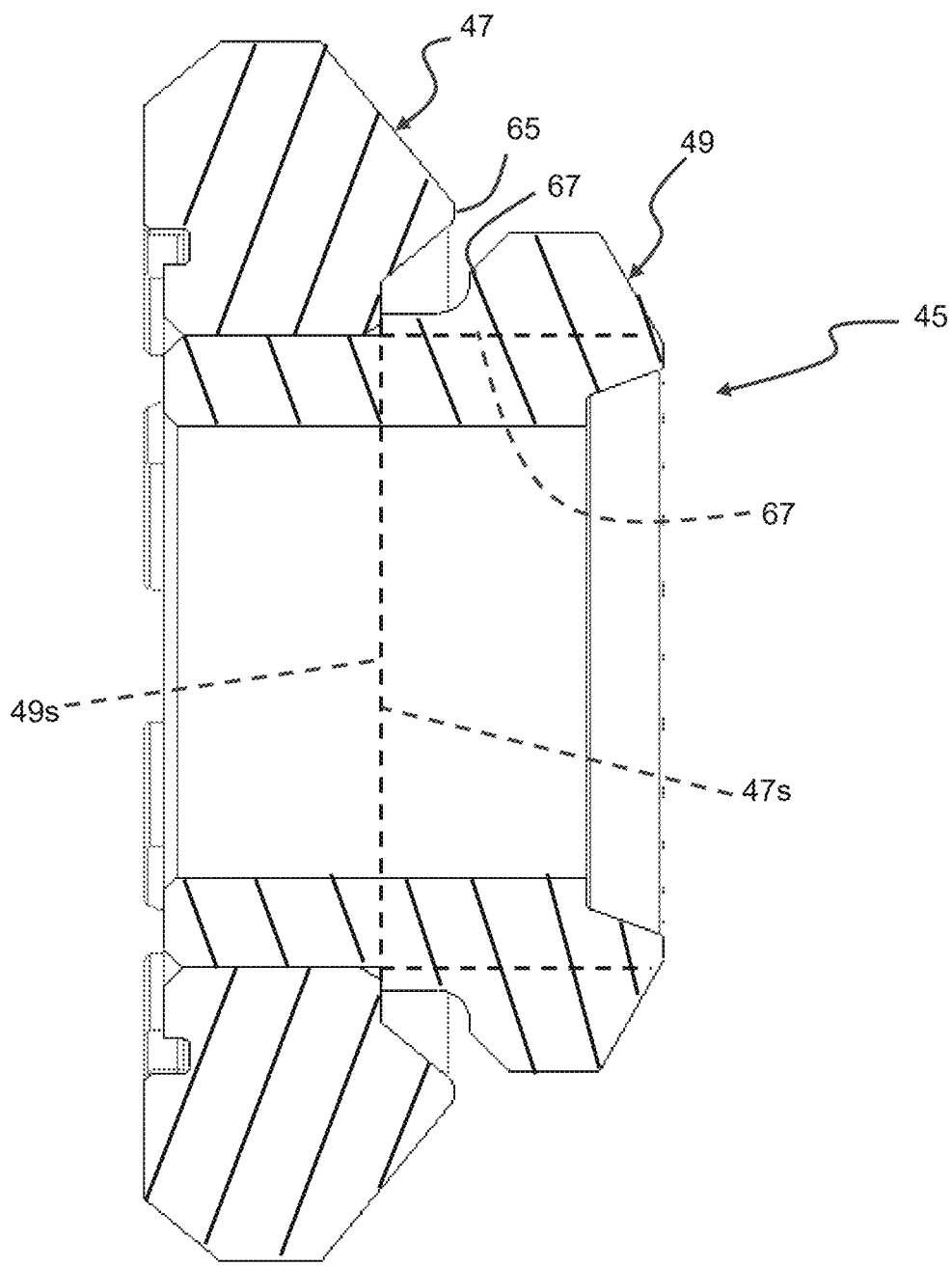
FIG. 8 is a cross-sectional view of an integrated interaxle differential bevel gear and input side gear according to an aspect of the present invention.

In the integrated interaxle differential bevel gear and input side gear 45, the interaxle differential bevel gear 47 and the input side gear 49 are non-rotatably connected so that a rear end 63 of the input side gear faces a front end 65 of the interaxle differential bevel gear. The toe of the interaxle differential bevel gear 47 and the heel of input side gear 49 ordinarily face each other. The interaxle differential bevel gear 47 and the input side gear 49 of the integrated interaxle differential bevel gear and input side gear may be formed as a unitary part, or may be made as separate parts that are non-rotatably attached to each other by any suitable means, such as by a key insert or a spline on an extending portion of the input side gear over which the interaxle differential bevel gear is attached as seen in FIG. 8. The interaxle differential bevel gear 47 and input side gear 49 may be attached together in any other suitable manner, as well, such as by a surface 47s (shown in phantom) of the interaxle differential bevel gear perpendicular to an axis of the interaxle differential bevel gear and a surface 49s (shown in phantom) of the input side gear perpendicular to an axis of the input side gear being bolted or welded face-to-face. As seen in phantom in FIG. 8, a splined or keyed shaft 67 may extend through an opening in at least one or both of the interaxle differential bevel gear 47 and input side gear 49 to non-rotatably attach the interaxle differential bevel gear and the input side gear to each other.

The drive axle assembly 25 may further include an interaxle differential lock arrangement 69. As seen in FIGS. 4 and 6, a suitable interaxle differential lock arrangement 69 comprises a first locking member 75 non-rotatably mounted on the input shaft 37 (FIG. 4) and a second locking member 77 on or attached to the interaxle differential bevel gear 47. The first locking member 75 and the second locking member 77 typically have mating surfaces that engage to lock the first and second locking members together so that the input shaft, the interaxle differential bevel gear, and the input side gear rotate together, which also causes the output side gear 43 and output shaft 39 to rotate at the same rotational speed as the input side gear and the input shaft. The first locking member 75 is movable, such as by a hydraulic or pneumatic piston 76, toward the second locking 77 member to engage with the second locking member and thereby lock the first locking member relative to the second locking member and away from the second locking member to disengage from the second locking member and unlock the first locking member relative to the second locking member.

As seen in FIG. 4, it is possible to support the interaxle differential bevel gear 47 and the input side gear 49 relative to the input shaft 37 with no bearings in contact with the integrated interaxle differential bevel gear and input side gear. This can reduce the number of bearings required in a drive axle assembly.

Example 1: A drive axle assembly, comprising:
an input shaft;
an output shaft; and
an interaxle differential comprising at least one spider gear rotatable about an axis perpendicular to the input shaft, an output side gear in meshing engagement with the at least one spider gear and non-rotatably mounted on the output shaft, and an integrated interaxle differential bevel gear and input side gear rotatably supported on the input shaft, the input side gear being in meshing engagement with the at least one spider gear.

Example 2: The drive axle assembly as set forth in example 1, further comprising an interwheel differential assembly arranged to receive torque from an interaxle differential bevel gear of the integrated interaxle differential bevel gear and input side gear.

Example 3: The drive axle assembly as set forth in example 2, wherein the interwheel differential assembly includes a differential gear on which one or more spider gears are mounted for rotation about an axis perpendicular to an axis of the differential gear.

Example 4: The drive axle assembly as set forth in example 3, further comprising a driven bevel gear in meshing engagement with the interaxle differential bevel gear.

Example 5: The drive axle assembly as set forth in example 4, wherein an axis of rotation of the driven bevel gear and an axis of rotation of the at least one spider gear lie on a plane perpendicular to an axis of rotation of the interaxle differential.

Example 6: The drive axle assembly as set forth in example 3, further comprising a hypoid gear in meshing engagement with the interaxle differential bevel gear.

Example 7: The drive axle assembly as set forth in example 1, wherein the integrated interaxle differential bevel gear and input side gear comprises an interaxle differential bevel gear and an input side gear, the interaxle differential bevel gear and the input side gear being non-rotatably connected so that a rear end of the input side gear faces a front end of the interaxle differential bevel gear.

Example 8: The drive axle assembly as set forth in example 7, wherein the interaxle differential bevel gear and the input side gear are formed as a unitary part.

Example 9: The drive axle assembly as set forth in example 8, wherein the interaxle differential bevel gear and the input side gear are separate parts that are non-rotatably attached to each other.

Example 10: The drive axle assembly as set forth in example 9, wherein a shaft extends through an opening in at least one of the interaxle differential bevel gear and input side gear to non-rotatably attach the interaxle differential bevel gear and the input side gear to each other.

Example 11: The drive axle assembly as set forth in example 1, further comprising an interaxle differential lock arrangement.

Example 12: The drive axle assembly as set forth in example 11, wherein the integrated interaxle differential bevel gear and input side gear comprises an interaxle differential bevel gear and an input side gear, and wherein the interaxle differential lock arrangement comprises a first locking member non-rotatably mounted on the input shaft and a second locking member on the interaxle differential bevel gear, the first locking member being movable toward the second locking member to engage with the second locking member and thereby lock the first locking member relative to the second locking member and movable away from the second locking member to disengage from the second locking member and unlock the first locking member relative to the second locking member.

Example 13: The drive axle assembly as set forth in example 1, wherein the integrated interaxle differential bevel gear and input side gear comprises an interaxle differential bevel gear and an input side gear, wherein no bearings support the integrated interaxle differential bevel gear and input side gear relative to the input shaft.

Example 14: A tandem drive truck comprising a drive train, the drive train comprising the drive axle assembly of example 1.

Example 15: An integrated interaxle differential bevel gear and input side gear for an interaxle differential, comprising:
a bevel gear; and
a side gear non-rotatably connected to the bevel gear so that a rear end of the side gear faces a front end of the interaxle differential bevel gear.

Example 16: The integrated interaxle bevel gear and input side gear as set forth in example 15, wherein the bevel gear and the side gear are formed as a unitary part.

Example 17: The integrated interaxle bevel gear and input side gear as set forth in example 15, wherein the bevel gear and the side gear are separate parts that are non-rotatably attached to each other.

Example 18: The integrated interaxle bevel gear and input side gear as set forth in example 17, wherein a shaft extends through an opening in at least one of the bevel gear and side gear to non-rotatably attach the bevel gear and the side gear to each other.

Example 19: An interaxle differential, the interaxle differential being adapted to be non-rotatably supported on an input shaft, the interaxle differential comprising: at least one spider gear rotatable about an axis perpendicular to an axis of the input shaft;

an output side gear in meshing engagement with the at least one spider gear and non-rotatably mountable about an output shaft; and an integrated interaxle differential bevel gear and input side gear non-rotatably supportable on the input shaft, the input side gear being in meshing engagement with the at least one spider gear.

Example 20: The interaxle differential as set forth in example 19, wherein the at least one spider gear comprises a first and a second spider gear, the first and the second spider gear both being in meshing engagement with the output side gear and the input side gear.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A drive axle assembly, comprising:
an input shaft;
an output shaft;
an interaxle differential comprising a case of the interaxle differential, at least one spider gear rotatable about an axis perpendicular to the input shaft and attached to the case of the interaxle differential, an output side gear in meshing engagement with the at least one spider gear and non-rotatably mounted on the output shaft, and an integrated interaxle differential bevel gear and input side gear assembly rotatably supported on the input shaft, the input side gear being in meshing engagement with the at least one spider gear;
an interwheel differential assembly arranged to receive torque from the interaxle differential bevel gear of the integrated interaxle differential bevel gear and input side gear
assembly, the interwheel differential assembly including a differential gear on which one or more spider gears are mounted for rotation about an axis perpendicular to an axis of the differential gear;
left and right drive wheels; and
left and right drive axles defining a drive axle axis disposed on the axis of rotation of the differential gear and directly connected to the left and right drive wheels, respectively,
wherein a toe of the integrated interaxle bevel gear faces a heel of the integrated interaxle input side gear.

2. The drive axle assembly as set forth in claim 1, wherein the differential gear is a hypoid gear in meshing engagement with the interaxle differential bevel gear.

3. The drive axle assembly as set forth in claim 1, wherein the integrated interaxle differential bevel gear and input side gear assembly comprises the interaxle differential bevel gear and the input side gear, the interaxle differential bevel gear and the input side gear being non-rotatably connected so that a rear end of the input side gear faces a front end of the interaxle differential bevel gear.

4. The drive axle assembly as set forth in claim 3, wherein the interaxle differential bevel gear and the input side gear are formed as a unitary part.

5. The drive axle assembly as set forth in claim 3, wherein the interaxle differential bevel gear and the input side gear are separate parts that are non-rotatably attached to each other.

6. The drive axle assembly as set forth in claim 5, wherein an attaching shaft extends through an opening in at least one of the interaxle differential bevel gear and input side gear to non-rotatably attach the interaxle differential bevel gear and the input side gear to each other.

7. The drive axle assembly as set forth in claim 1, further comprising an interaxle differential lock arrangement.

8. The drive axle assembly as set forth in claim 7, wherein the integrated interaxle differential bevel gear and input side gear assembly comprises the interaxle differential bevel gear and the input side gear, and wherein the interaxle differential lock arrangement comprises a first locking member non-rotatably mounted on the input shaft and a second locking member on the interaxle differential bevel gear, the first locking member being movable toward the second locking member to engage with the second locking member and thereby lock the first locking member relative to the second locking member and movable away from the second locking member to disengage from the second locking member and unlock the first locking member relative to the second locking member.

9. The drive axle assembly as set forth in claim 1, wherein the integrated interaxle differential bevel gear and input side gear assembly comprises the interaxle differential bevel gear and the input side gear, wherein no bearings support the integrated interaxle differential bevel gear and input side gear assembly relative to the input shaft.

10. A tandem drive truck comprising a drive train, the drive train comprising the drive axle assembly of claim 1.

11. A drive axle assembly, comprising:
- an input shaft;
- an output shaft;
- an interaxle differential comprising a case of the interaxle differential, at least one spider gear rotatable about an axis perpendicular to the input shaft and attached to the case of the interaxle differential, an output side gear in meshing engagement with the at least one spider gear and non-rotatably mounted on the output shaft, and an integrated interaxle differential bevel gear and input side gear assembly rotatably supported on the input shaft, the input side gear being in meshing engagement with the at least one spider gear;
- an interwheel differential assembly arranged to receive torque from the interaxle differential bevel gear of the integrated interaxle differential bevel gear and input side gear assembly, the interwheel differential assembly including a differential gear on which one or more spider gears are mounted for rotation about an axis perpendicular to an axis of the differential gear;
- left and right drive wheels; and
- left and right drive axles defining a drive axle axis disposed on the axis of rotation of the differential gear and directly connected to the left and right drive wheels, respectively; and
- a driven bevel gear in meshing engagement with the interaxle differential bevel gear.

12. The drive axle assembly as set forth in claim 11, wherein an axis of rotation of the driven bevel gear and the axis of rotation of the at least one spider gear lie on a plane perpendicular to an axis of rotation of the interaxle differential.

* * * * *